No. 841,488. PATENTED JAN. 15, 1907.
W. C. DOIDGE.
GARDEN IMPLEMENT.
APPLICATION FILED APR. 5, 1906.
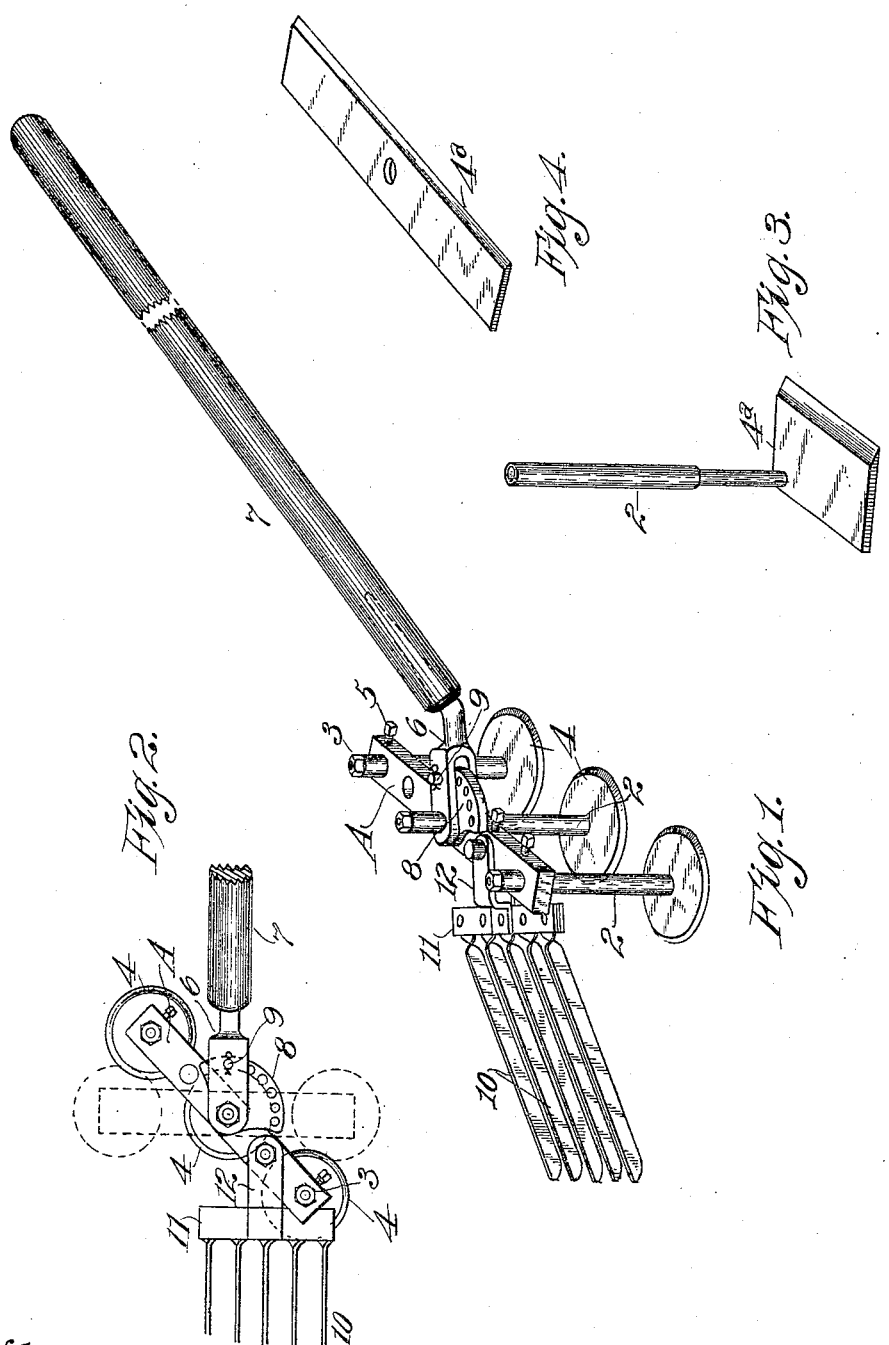
Witnesses:
F. G. Maynard
Inventor:
William C. Doidge
By Geo. H. Strong.
Atty

UNITED STATES PATENT OFFICE.

WILLIAM C. DOIDGE, OF LODI, CALIFORNIA.

GARDEN IMPLEMENT.

No. 841,488.      Specification of Letters Patent.      Patented Jan. 15, 1907.

Application filed April 5, 1906. Serial No. 310,018.

*To all whom it may concern:*

Be it known that I, WILLIAM C. DOIDGE, a citizen of the United States, residing at Lodi, in the county of San Joaquin and State of California, have invented new and useful Improvements in Garden Implements, of which the following is a specification.

My invention relates to an implement which is especially designed for work in gardens and like places.

It consists in a combination of devices for loosening the soil and clearing it of weeds and in details of construction, which will be more fully explained by reference to the accompanying drawings, in which—

Figure 1 is a perspective view of my apparatus. Fig. 2 is a plan view showing an oblique adjustment. Figs. 3 and 4 are forms of cutters to be used in conjunction with the apparatus.

It is the object of my invention to provide a device for loosening up the soil and clearing it of weeds, especially between rows of plants in which the width of space between the rows may vary, and by means of adjustments carried by my apparatus I am enabled to adjust the cutters to any desired width.

A is a bar having vertical holes made through it, and within these holes are fitted tubular sleeves 2. Within these tubes vertical shafts are fixed in place in any suitable manner, as by nuts 3, screwed upon their upper ends.

To the lower ends of the shafts are fitted the thin flat disks 4, and the shafts, with the tubes 2, may be adjusted up and down with relation to the bar A and fixed at any point of adjustment by set-screws, as at 5.

6 is a forked yoke pivoted centrally and vertically to the bar A, and to this yoke is fixed a handle, as at 7, for convenient operation of the device.

8 is a segment having holes or perforations around its periphery, and the yoke 6 carries a pin 9, which is adapted to fit into any of the holes in the segment, and thus hold the bar A in the desired relation and angle with the handle 7. Thus if the rows are sufficiently far apart to allow the full width of the cutters to act the bar A may be set at right angles with the handle. Then by moving the apparatus back and forth the blades 4 will be caused to cut any weeds and to loosen up the ground, the edges of the blade being made thin or beveled for this purpose.

In place of the disks 4 I may use the flat plates of different lengths, as shown at $4^a$ in Figs. 3 and 4, the edges of these plates being beveled, as shown, to serve as hoes or cutters.

It will be understood that any other suitable or desired form of hoe or cutter may be employed in conjunction with the apparatus; but I prefer circular disks.

If the spaces between the rows are contracted, it is desirable to make a narrow cut in order not to injure the plants. The head A is then turned to stand at a more or less acute angle with the handle 7, as plainly shown in Fig. 2, and it will be seen that by this adjustment the cutters may be moved much nearer together than when the head stands at right angles with the handle. In this manner by varying the shape and size of the cutters and by changing the angles of the head to the handle almost any desired width of cut may be provided for.

The depth to which the cutters enter the ground is regulated by raising or lowering the handle 7 and correspondingly changing the inclination of the cutters.

In order to smooth and pulverize the ground which may have been loosened by the action of the cutters, I employ a rake composed of teeth, as shown at 10, fixed to a head 11. This head is bolted or otherwise secured to the head A by means of a suitable strap or connection 12 and swivels upon the head A, so as to stand in the line of travel of the machine whether it is working with the head at right angles with the handle or obliquely thereto. The rake thus serves to pulverize and smooth the surface of the ground after the action of the cutters.

The circular cutter is especially serviceable, because its edge is always at the same distance from the center, where it is attached to the post or stand, and therefore any change in the line of draft always presents the same edge equally distant from the post and equally efficient in its work.

Having thus described my invention, what I claim, and desire to secure by Letters Patent, is—

1. A cultivator implement comprising a head, sleeves vertically adjustable therein, cutters having standards passing through the sleeves and fixed relative thereto, a handle pivoted to said head, and a rack and means whereby the angle of the head to the handle may be varied.

2. In an earth cultivating and clearing device, a head having vertical sleeves extending downwardly therefrom, shafts fixed within the head, and cutter-blades fixed to the lower end of the shafts to work in substantially horizontal planes, a curved segment formed upon the head, a slotted yoke and a handle secured thereto, and interlocking means whereby the head and its cutters may be set at different angles with the yoke and handle.

3. In an implement for cultivating and weeding the soil, a head having vertically-disposed sleeves, shafts fixed within the sleeves having cutters fixed horizontally to their lower ends, means for independently adjusting the sleeves and cutters with relation to the head, a segmental rack fixed to the head, a forked yoke pivoted to the head to extend radially with relation to the rack, a handle fixed to the yoke, and means for locking the yoke to the segment at different angles with the head and its cutters.

4. In a device for cultivating and clearing the soil, a head having vertical adjustable sleeves, shafts extending therethrough with cutters fixed to the lower ends, a handle and means for varying its position with relation to the head, and a rake swiveled to said head adapted to follow the line of travel of the cutters.

In testimony whereof I have hereunto set my hand in presence of two subscribing witnesses.

WILLIAM C. DOIDGE.

Witnesses:
 HENRY P. TRICOU,
 S. H. NOURSE.